(12) United States Patent
Madonna et al.

(10) Patent No.: US 11,021,966 B2
(45) Date of Patent: Jun. 1, 2021

(54) VANE CORE ASSEMBLIES AND METHODS

(71) Applicant: UNITED TECHNOLOGIES CORPORATION, Farmington, CT (US)

(72) Inventors: Nicholas J. Madonna, North Haven, CT (US); Daniel P. Preuss, Newington, CT (US); Kristopher K. Anderson, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 20 days.

(21) Appl. No.: 16/393,849

(22) Filed: Apr. 24, 2019

(65) Prior Publication Data

US 2020/0340362 A1    Oct. 29, 2020

(51) Int. Cl.
| | |
|---|---|
| *F01D 5/18* | (2006.01) |
| *F01D 9/02* | (2006.01) |
| *F01D 9/04* | (2006.01) |
| *F01D 25/12* | (2006.01) |
| *F01D 9/06* | (2006.01) |

(52) U.S. Cl.
CPC ............. *F01D 5/186* (2013.01); *F01D 5/18* (2013.01); *F01D 9/02* (2013.01); *F01D 9/041* (2013.01); *F01D 9/047* (2013.01); *F01D 25/12* (2013.01); *F01D 5/187* (2013.01); *F01D 9/06* (2013.01); *F05D 2260/202* (2013.01)

(58) Field of Classification Search
CPC ... F01D 5/18; F01D 9/06; F01D 5/187; F01D 9/047; F01D 5/284; F01D 25/12; F05D 2260/202; F05D 2260/20
See application file for complete search history.

(56) References Cited

U.S. PATENT DOCUMENTS 4,017,213 A * 4/1977 Przirembel ............. F01D 5/187
416/97 A
4,353,679 A * 10/1982 Hauser ................... F01D 5/189
415/115

(Continued)

FOREIGN PATENT DOCUMENTS

EP    2383435 A1 * 11/2011 ............. F01D 9/042
EP    2383435 A1    11/2011

OTHER PUBLICATIONS

European Search Report for European Application No. 20169674.7 dated Aug. 31, 2020.

*Primary Examiner* — Ninh H. Nguyen
*Assistant Examiner* — Brian Christopher Delrue
(74) *Attorney, Agent, or Firm* — Carlson, Gaskey & Olds, P.C.

(57) ABSTRACT

A gas turbine engine includes a compressor section rotatable about an axis, a combustor in fluid communication with the compressor section, and a turbine section in fluid communication with the combustor. The turbine section includes a vane assembly including a radially outer platform with respect to the axis. A first airfoil extend from the radially outer platform to a radially inner platform. A rail extends radially inward from the inner platform, and a connected passage includes an airfoil passage within the first airfoil. A platform passage is located within the inner platform, and a rail passage is located within the rail. The airfoil passage, the platform passage, and the rail passage are fluidly connected.

18 Claims, 5 Drawing Sheets

(56) References Cited

U.S. PATENT DOCUMENTS

| | | | | |
|---|---|---|---|---|
| 4,946,346 A * | 8/1990 | Ito | F01D 5/189 | 415/115 |
| 5,399,065 A * | 3/1995 | Kudo | F01D 5/187 | 415/115 |
| 6,017,189 A * | 1/2000 | Judet | F01D 5/081 | 416/97 R |
| 6,241,467 B1 * | 6/2001 | Zelesky | F01D 9/04 | 415/115 |
| 6,254,333 B1 * | 7/2001 | Merry | F01D 11/005 | 415/115 |
| 6,901,661 B2 * | 6/2005 | Jonsson | F01D 5/187 | 29/889.721 |
| 7,001,141 B2 * | 2/2006 | Cervenka | F01D 5/187 | 415/115 |
| 7,097,417 B2 * | 8/2006 | Liang | F01D 5/145 | 415/115 |
| 7,121,793 B2 * | 10/2006 | Correia | F01D 9/041 | 415/191 |
| 7,524,163 B2 * | 4/2009 | Self | F01D 5/187 | 415/115 |
| 7,625,172 B2 * | 12/2009 | Walz | F01D 5/186 | 415/115 |
| 7,695,247 B1 * | 4/2010 | Liang | F01D 5/187 | 416/97 R |
| 8,147,197 B2 * | 4/2012 | Morris | F01D 5/30 | 416/97 R |
| 8,353,669 B2 * | 1/2013 | Chon | F01D 5/187 | 416/96 R |
| 8,356,978 B2 * | 1/2013 | Beattie | B22C 9/10 | 416/193 A |
| 8,360,716 B2 * | 1/2013 | Bergman | F01D 9/02 | 415/190 |
| 8,511,995 B1 * | 8/2013 | Liang | F01D 5/186 | 416/97 R |
| 8,707,712 B2 * | 4/2014 | Spangler | F01D 9/041 | 60/806 |
| 9,151,164 B2 * | 10/2015 | Tardif | F01D 5/187 | |
| 9,803,488 B2 * | 10/2017 | Riley | F01D 5/186 | |
| 9,856,747 B2 * | 1/2018 | Davis | F01D 9/041 | |
| 9,869,200 B2 * | 1/2018 | Jones | F01D 5/189 | |
| 9,896,950 B2 * | 2/2018 | Wilier | F01D 9/041 | |
| 9,982,542 B2 * | 5/2018 | Lewis | F01D 5/186 | |
| 9,995,173 B2 * | 6/2018 | Castaneda | F01D 25/12 | |
| 10,024,172 B2 * | 7/2018 | Boeke | F01D 25/12 | |
| 10,041,374 B2 * | 8/2018 | Spangler | F01D 25/24 | |
| 10,190,418 B2 * | 1/2019 | Kwon | F01D 11/08 | |
| 10,494,932 B2 * | 12/2019 | Jones | F01D 5/187 | |
| 2003/0037436 A1 * | 2/2003 | Ducotey, Jr. | B23P 6/002 | 29/889.1 |
| 2003/0068222 A1 * | 4/2003 | Cunha | F01D 5/189 | 415/115 |
| 2006/0021730 A1 * | 2/2006 | Marcin, Jr. | B23P 15/04 | 164/122.1 |
| 2006/0024163 A1 * | 2/2006 | Keith | F01D 5/081 | 416/97 R |
| 2007/0020100 A1 * | 1/2007 | Beeck | F01D 5/187 | 416/193 A |
| 2007/0059178 A1 * | 3/2007 | Shapiro | F01D 25/246 | 416/181 |
| 2007/0147997 A1 * | 6/2007 | Cunha | F01D 5/187 | 416/97 R |
| 2008/0190114 A1 * | 8/2008 | Surace | F01D 25/08 | 60/806 |
| 2009/0169360 A1 * | 7/2009 | Broomer | F01D 25/12 | 415/115 |
| 2010/0040479 A1 * | 2/2010 | Spangler | F01D 11/006 | 416/97 R |
| 2010/0290920 A1 * | 11/2010 | Liang | F01D 5/187 | 416/97 R |
| 2011/0123310 A1 * | 5/2011 | Beattie | F01D 5/18 | 415/115 |
| 2012/0107134 A1 * | 5/2012 | Harris, Jr. | F01D 5/18 | 416/97 R |
| 2012/0148383 A1 * | 6/2012 | Gear | F01D 5/187 | 415/115 |
| 2012/0171046 A1 * | 7/2012 | Boyer | F01D 5/18 | 416/97 R |
| 2012/0328451 A1 * | 12/2012 | Lomas | F01D 5/187 | 416/97 R |
| 2013/0156601 A1 * | 6/2013 | Propheter-Hinckley | F01D 5/187 | 416/97 R |
| 2014/0000283 A1 * | 1/2014 | Spangler | F01D 5/187 | 60/806 |
| 2014/0003961 A1 * | 1/2014 | Willey | F04D 29/542 | 416/97 R |
| 2014/0037461 A1 * | 2/2014 | Lee | F01D 5/18 | 416/97 R |
| 2014/0163717 A1 * | 6/2014 | Das | B33Y 10/00 | 700/119 |
| 2014/0219778 A1 * | 8/2014 | Boeke | F01D 25/12 | 415/115 |
| 2015/0211376 A1 * | 7/2015 | Riley | F01D 5/186 | 415/115 |
| 2015/0285086 A1 * | 10/2015 | Bangerter | F01D 25/12 | 415/115 |
| 2015/0285097 A1 * | 10/2015 | Spangler | B22C 9/103 | 415/116 |
| 2015/0308449 A1 * | 10/2015 | Bareiss | B22C 9/04 | 416/90 R |
| 2015/0322860 A1 * | 11/2015 | Slavens | F01D 25/12 | 60/806 |
| 2016/0146019 A1 * | 5/2016 | Pizano | F01D 25/12 | 415/115 |
| 2016/0160652 A1 * | 6/2016 | Bangerter | F01D 5/18 | 60/806 |
| 2016/0201487 A1 * | 7/2016 | Spangler | F01D 5/189 | 415/115 |
| 2016/0326894 A1 * | 11/2016 | Boeke | F01D 25/12 | |
| 2017/0022842 A1 * | 1/2017 | Spangler | F01D 25/12 | |
| 2017/0130590 A1 * | 5/2017 | Spangler | F01D 9/02 | |
| 2017/0198602 A1 * | 7/2017 | Hernandez | F01D 25/12 | |
| 2018/0106156 A1 * | 4/2018 | LoRicco | F01D 9/065 | |
| 2018/0223681 A1 * | 8/2018 | Gallier | F01D 11/005 | |
| 2018/0230806 A1 * | 8/2018 | Zemitis | F01D 5/225 | |
| 2018/0347466 A1 * | 12/2018 | Correia | F01D 5/189 | |
| 2019/0071979 A1 * | 3/2019 | McMahon | F01D 5/186 | |
| 2019/0203612 A1 * | 7/2019 | McMahon | F01D 25/12 | |
| 2019/0211688 A1 * | 7/2019 | LoRicco | F02C 3/04 | |
| 2019/0234234 A1 * | 8/2019 | Anderson | F01D 9/041 | |
| 2019/0309632 A1 * | 10/2019 | Arisi | B23H 9/14 | |
| 2019/0323358 A1 * | 10/2019 | Anderson | F01D 5/18 | |
| 2020/0173291 A1 * | 6/2020 | Rathay | F01D 5/187 | |
| 2020/0182068 A1 * | 6/2020 | Spangler | F01D 5/186 | |
| 2020/0248566 A1 * | 8/2020 | Bitzko | F01D 11/006 | |

* cited by examiner

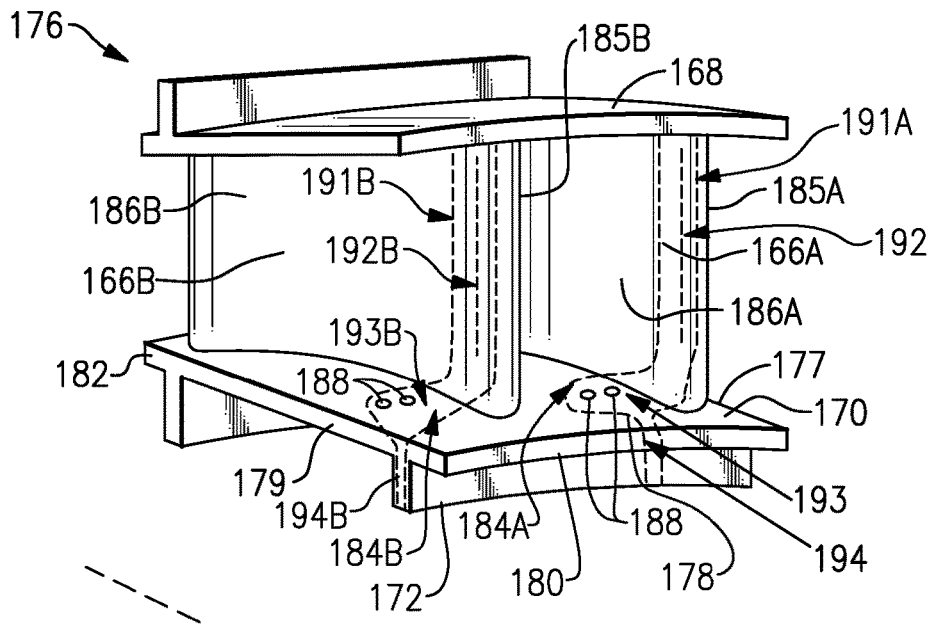

FIG.6

```
200
 ├─202
     ┌─────────────────────────────────────────────────────┐
     │ FORMING A CERAMIC CORE 195 INCLUDING AN AIRFOIL CASTING │
     │ CORE PORTION 196, A PLATFORM SHELF CASTING CORE PORTION 197, │
     │ AND A RAIL CASTING CORE PORTION 198 │
     └─────────────────────────────────────────────────────┘
                              │
 ├─204                        ▼
     ┌─────────────────────────────────────────────────────┐
     │ CASTING A VANE ASSEMBLY 176 AROUND THE CORE 195     │
     └─────────────────────────────────────────────────────┘
```

FIG.7

VANE CORE ASSEMBLIES AND METHODS

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A gas turbine engine includes a fan section driven by the low spool such that the low pressure compressor, low pressure turbine and fan section rotate at a common speed in a common direction.

As can be appreciated, many of the components in a gas turbine engine see very high temperatures. Thus, it is known to supply cooling air to various components such as in the turbine section and/or compressor section.

SUMMARY

A gas turbine engine according to an example of this disclosure includes a compressor section rotatable about an axis, a combustor in fluid communication with the compressor section, and a turbine section in fluid communication with the combustor. The turbine section includes a vane assembly including a radially outer platform with respect to the axis. A first airfoil extends from the radially outer platform to a radially inner platform. A rail extends radially inward from the inner platform, and a connected passage includes an airfoil passage within the first airfoil. A platform passage is located within the inner platform, and a rail passage is located within the rail. The airfoil passage, the platform passage, and the rail passage are fluidly connected.

In a further example of the foregoing, a second airfoil extends from the radially outer platform to the radially inner platform. A second connected passage includes a second airfoil passage within the second airfoil. A second platform passage is located within the inner platform, and a second rail passage is located within the rail. The second airfoil passage, the second platform passage, and the second rail passage are fluidly connected.

In a further example of any of the foregoing, a plurality of cooling holes extend from the platform passage to a gaspath surface of the inner platform.

In a further example of any of the foregoing, the plurality of cooling holes extend toward a trailing edge of the platform as they extend toward the gaspath surface.

In a further example of any of the foregoing, the airfoil passage forms a leading edge cavity and a second cavity spaced toward a trailing edge of the airfoil from the leading edge cavity.

In a further example of any of the foregoing, the gas turbine engine includes a second rail, and the first rail is axially forward of the second rail with respect to a core flow path of the gas turbine engine.

In a further example of any of the foregoing, a cooling air source is configured to supply cooling air from the outer platform through the airfoil passage, and to the platform passage.

In a further example of any of the foregoing, a plurality of cooling holes extend from the platform passage to a gaspath surface of the inner platform, and are configured to allow at least a portion of the cooling air in the platform passage to exit through the plurality of cooling holes.

In a further example of any of the foregoing, the turbine includes a first row of vanes, a second row of vanes aft of the first row of vanes, and a row of blades axially between the first row of vanes and second row of vanes. The second row of vanes include the vane assembly.

In a further example of any of the foregoing, the second row of vanes include a second vane assembly identical to the vane assembly.

A vane assembly for a gas turbine engine according to an example of this disclosure includes an outer platform, an inner platform, a first airfoil that extends from the outer platform to the inner platform, and a rail that extends from the inner platform in a direction away from the first airfoil. A connected passage includes an airfoil passage within the first airfoil, a platform passage within the inner platform, and a rail passage within the rail. The airfoil passage, the platform passage, and the rail passage are fluidly connected. A plurality of cooling holes extend from the platform passage to a gaspath surface of the inner platform.

In a further example of the foregoing, a second airfoil extends from the outer platform to the inner platform. The platform passage is aligned circumferentially between a pressure side of the first airfoil and a suction side of the second airfoil.

In a further example of any of the foregoing, a second airfoil extends from the outer platform to the inner platform. A second connected passage includes a second airfoil passage within the second airfoil. A second platform passage is located within the inner platform, and a second rail passage is located within the rail. The second airfoil passage, the second platform passage, and the second rail passage are fluidly connected.

In a further example of any of the foregoing, a second airfoil extends from the outer platform to the inner platform. The platform passage is aligned circumferentially between a pressure side of the first airfoil and a suction side of the second airfoil. The second platform passage is aligned circumferentially between a pressure side of the second airfoil and a mate face of the platform.

In a further example of any of the foregoing, the plurality of cooling holes extend toward a trailing edge of the platform as they extend toward the gas path surface.

A method of manufacturing a vane assembly for a gas turbine engine according to an example of this disclosure includes forming a ceramic core, which includes an airfoil core, a platform core, and a rail core, and casting a vane assembly around the core. The vane assembly includes an outer platform and an inner platform. An airfoil extends from the outer platform to the inner platform, and a rail extends radially inward from the inner platform. The airfoil core forms a first passage within the airfoil, the platform core forms a second passage within the inner platform, and the rail core forms a third passage within the rail.

In a further example of the foregoing, the casting step includes forming a wax pattern around the ceramic core, forming a dipped ceramic shell around the wax pattern, removing the wax pattern to form a void, and then casting the vane assembly in the void.

In a further example of any of the foregoing, the core is destroyed after the casting step.

In a further example of any of the foregoing, a plurality of cooling holes are machined from the second passage to a gaspath surface of the inner platform.

In a further example of any of the foregoing, the plurality of cooling holes extend toward a trailing edge of the platform as they extend toward the gas path surface.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 6 illustrates the second example vane assembly of FIG. 5A.

FIG. 7 illustrates a flow chart of an example method of manufacturing a vane assembly.

DETAILED DESCRIPTION

Figure 1:
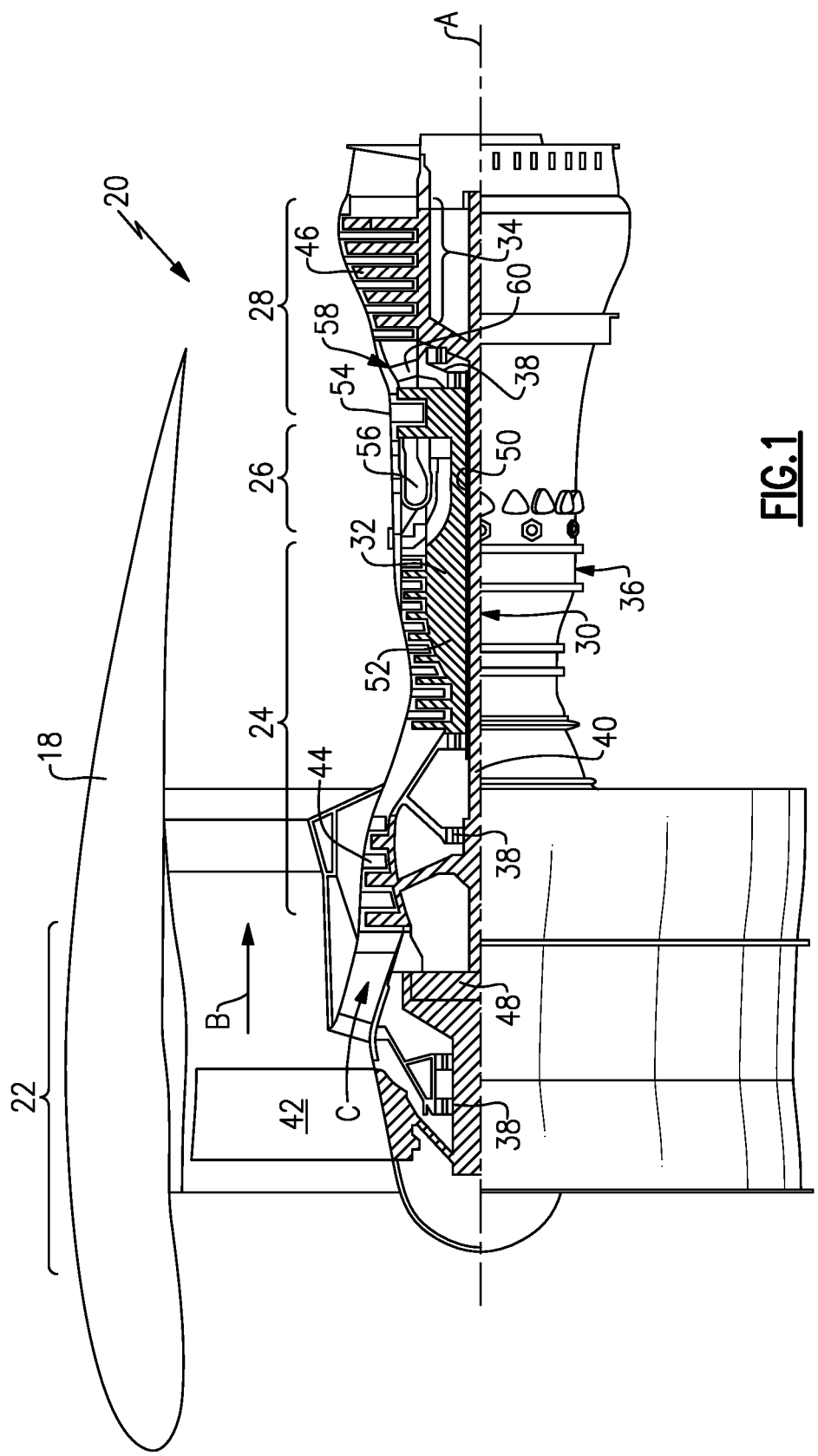
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
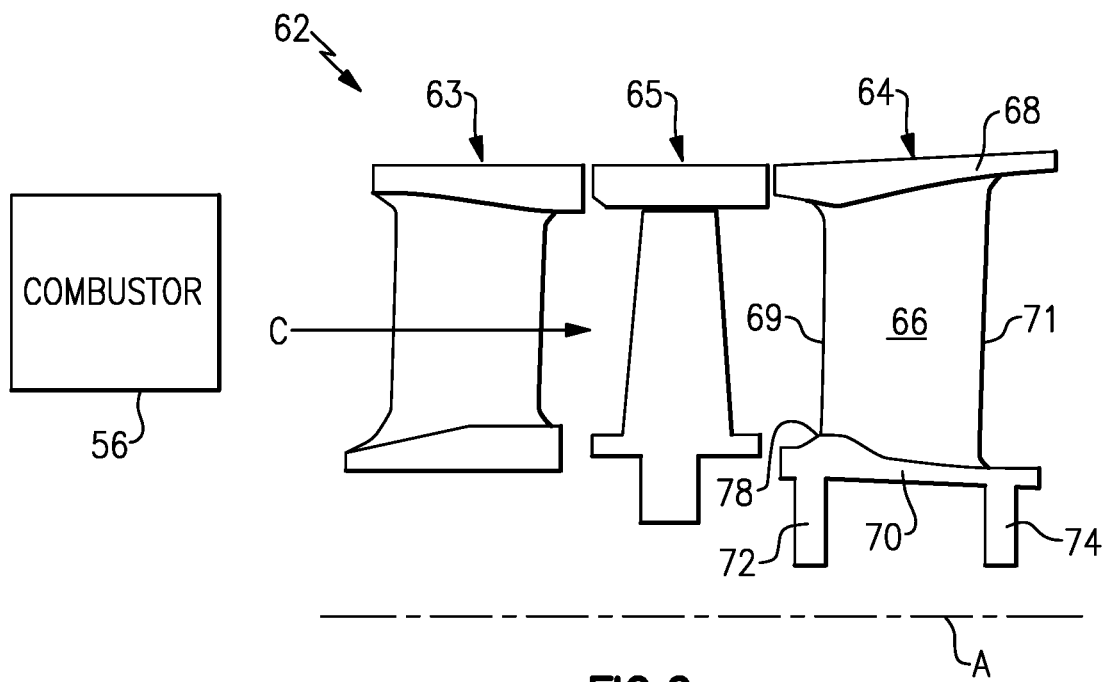
FIG. 2 schematically illustrates an example section of a high pressure turbine of the example gas turbine engine of FIG. 1.

FIG. 2 schematically illustrates an example section 62 of the high pressure turbine 54 (FIG. 1) of the example gas turbine engine 20. The section 62 includes a first row of stator vanes 63 and a second row of stator vanes 64. A row of turbine blades 65 is axially between the first row of stator vanes 63 and the second row of stator vanes 64 with respect to the axis A. The first row of stator vanes 63 is immediately adjacent the combustor 56 with respect to the core flow path C, as shown schematically.

The second row of stator vanes 64 includes a plurality of circumferentially spaced airfoils 66 extending radially between a radially outer platform 68 and a radially inner platform 70. Each airfoil 66 defines a leading edge 69 and a trailing edge 71 with respect to the core flow path C. A forward rail 72 and aft rail 74 may extend radially inward from each radially inner platform 70. The radially inner platform 70 includes a gaspath surface 78 that partially bounds the core flow path C. While the disclosed examples relate to improved cooling of the radially inner platforms 70 in the second row of stator vanes 64 in the high pressure turbine 54, other platforms, stages, and/or vane assemblies may benefit from this disclosure.

Figure 3:
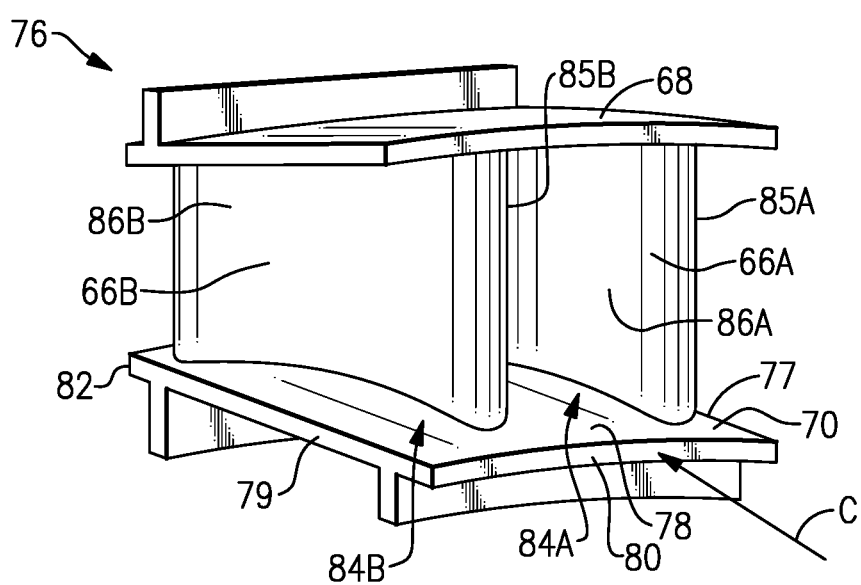
FIG. 3 illustrates an example vane assembly.

FIG. 3 illustrates a vane assembly 76 from the second row of stator vanes 64 shown in FIG. 2. In some examples, the second row of stator vanes 64 includes a plurality of circumferentially adjacent vane assemblies or segments 76. The circumferentially adjacent vane assemblies 76 may be identical. The example vane assembly 76 includes an outer platform 68, an inner platform 70, and two airfoils 66A, 66B extending radially between. Other vane assemblies may benefit from this disclosure, including assemblies with a single airfoil per inner and outer platforms.

The inner platform 70 extends circumferentially between a first mate face 77 and a second mate face 79, and axially (with respect to axis A in FIG. 2) from a leading platform edge 80 to a trailing platform edge 82. The first mate face 77 is configured to mate with the second mate face 79 of a circumferentially adjacent vane assembly 76. The airfoils 66A, 66B include respective suction sides 85A, 85B and pressure sides 86A, 86B.

Applicant has identified areas 84A, 84B of the gaspath surface 78 as regions needing enhanced cooling. The area 84A is circumferentially between the pressure side 86A and the suction side 85B and nearer the leading edge 80 than the trailing edge 82. In some examples, the areas 84A, 84B are in the forward 50% of the axial length of the platform 70.

The area 84B is circumferentially between the pressure side 86B and the mate face 79 and nearer the leading edge 80 than the trailing edge 82.

Figure 4:
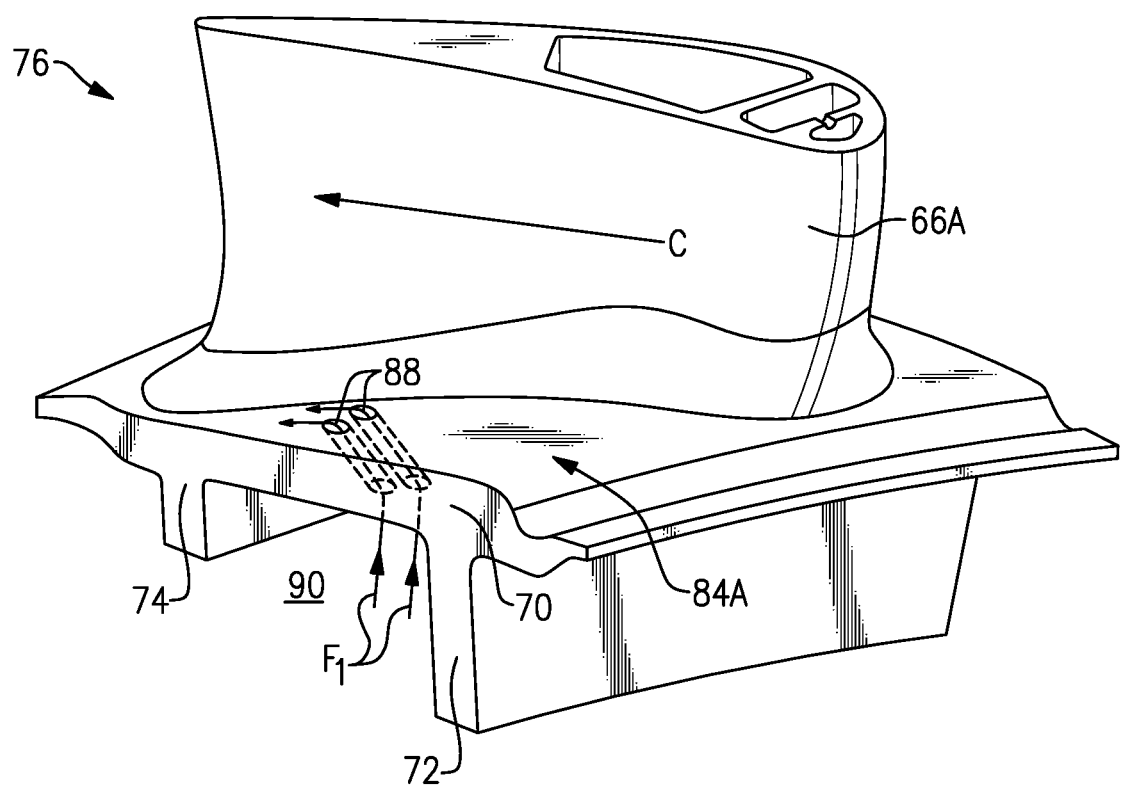
FIG. 4 illustrates a portion of the example vane assembly of FIG. 3.

FIG. 4 illustrates a portion of the vane assembly 76 of FIG. 3. As shown schematically by flow F1, cooling holes 88 on the inner platform 70 are fed by pressurized air from a cavity 90 between the forward rail 72 and the aft rail 74, as a result of the pressure ratio between the core flow path C and the pressure under the inner platform 70, i.e., the pressure of air F1 is greater than the pressure in the core flow path C at the location of cooling holes 88. In some examples, the air F1 is bled off the high pressure compressor 52 (See FIG. 1). In some examples, the air F1 may be plumbed to an outer diameter of the vane 76, through cores of the airfoils 66A, 66B of the vane 76 (see FIG. 3), and to the cavity 90. However, the pressure of air F1 in the cavity 90 is less than the core flow path C pressure at the areas 84A, 84B and therefore cooling holes from the cavity 90 in this region would ingest air from the core flow path C.

Figure 5A:
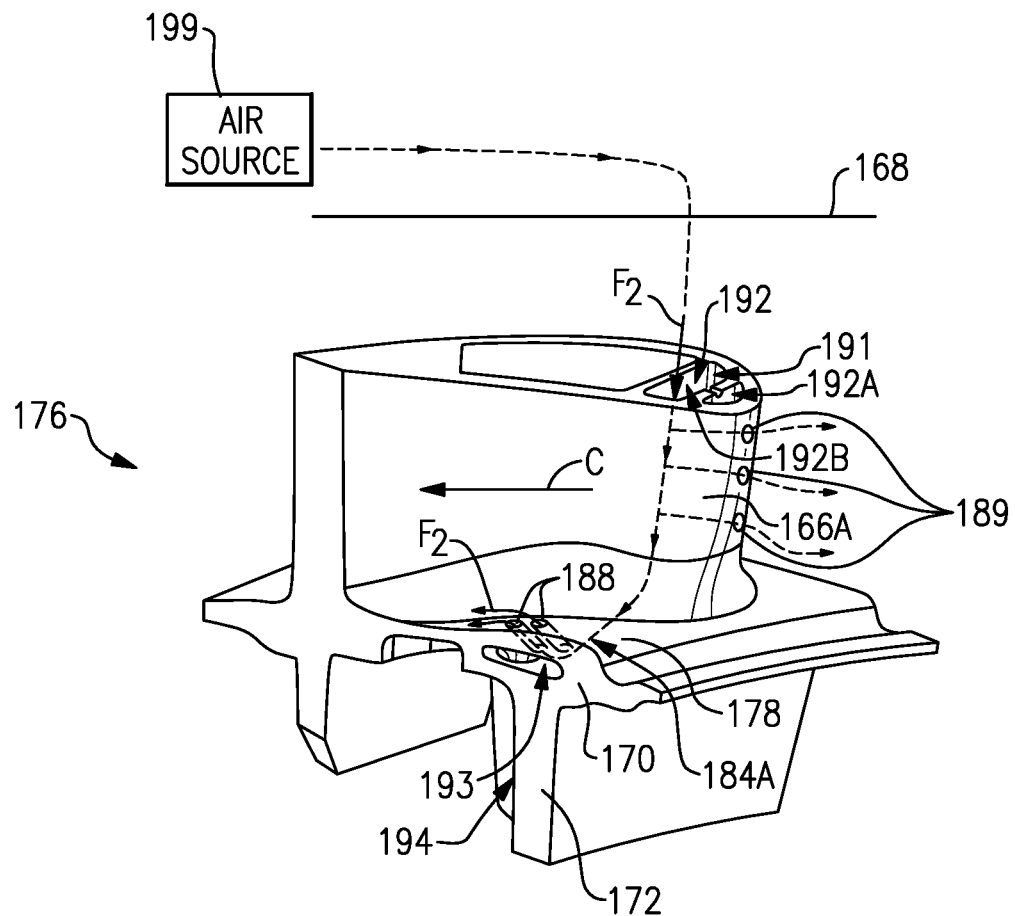
FIG. 5A illustrates a portion of a second example vane assembly.

FIG. 5A illustrates a portion of a novel vane assembly 176 with a section cut through the region 184A. It should be understood that like reference numerals identify corresponding or similar elements throughout the several drawings. A connected passage 191 is provided in the vane assembly 176 and includes an airfoil passage 192 within the airfoil 166A, a platform passage 193 within the inner platform 170, and a rail passage 194 within the forward rail 172. In the example shown, the airfoil passage 192, the platform passage 193, and the rail passage 194 form fluidly connected passage 191 such that the portions 192, 193, 194 are in fluid communication. In some examples, as shown, the leading edge of the platform passage 193 is aft of the leading edge of the airfoil 166A. In some examples, the airfoil passage 192 includes a leading edge cavity 192A and a second cavity 192B spaced toward the trailing edge from the leading edge cavity 192A and in fluid communication with the leading edge cavity 192A. In some examples, the platform passage 193 is not in fluid communication with passages in the airfoil 166A other than passages 192A, 192B As shown schematically at F2, pressurized air is fed from a cooling air source 199 to supply cooling air through the outer platform 168, radially inward through the airfoil passage 192, and to the platform passage 193. In some examples, the air F2 is compressor exit bypass air. In some examples, the air F2 has at least 35% greater pressure than the air F1. At least a portion of the cooling air may exit the platform passage 193 radially outward through cooling holes 188 located at the area 184A. In some examples, the holes 88 of FIG. 4 may also be included in the vane assembly 176. The cooling holes 188 extend from the platform passage 193 radially outward to a gaspath surface 178 of the inner platform 170, such that air exiting through the cooling holes 188 provides film cooling to the surface 178 at the area 184A. In some examples, air F2 also exits the cavity 192A through holes 189 extending from the cavity 192A to the outer surface of the leading edge of the airfoil 166A. In some examples, the air F2 does not exit through the rail 172. In some examples, the holes 189 are shower head film cooling holes. The pressure of the air F2 is higher than that of the air F1 (FIG. 4), such that air flowing to the cooling holes 188 will have a positive outflow margin relative to the core flow path C for providing film cooling to the area 184A. In some examples, as shown, the cooling holes are sloped toward the trailing edge as they extend from the platform passage 193 to the gas path surface 178. The holes 188, 189 are shown schematically in FIG. 5A, and more or fewer holes 188, 189 than those shown may be utilized in some examples.

Figure 5B:
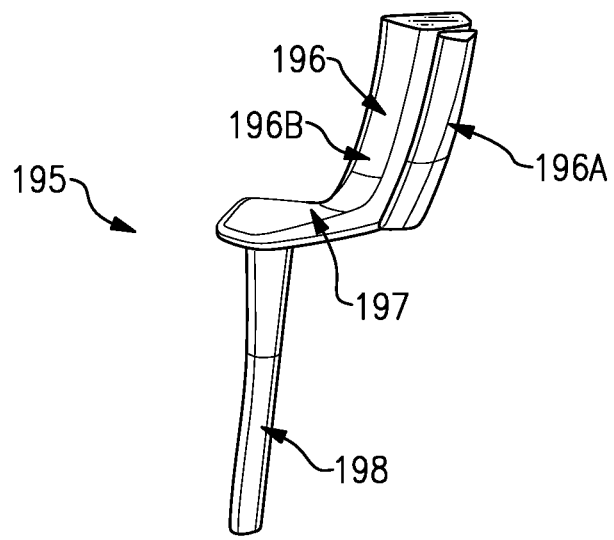
FIG. 5B illustrates an example core for the second example vane assembly of FIG. 5A.

FIG. 5B illustrates a core 195 for creation of the connected passage 191 in the vane assembly 176 shown in FIG. 5A. In the example, the core 195 is a ceramic core used in an investment casting process to define the internal connected passage 191 features of the vane assembly 176. As is known in investment casting, the external features of the vane assembly 176 are defined by die halves and corresponding die inserts (not shown). Wax is injected between the connected passage 191 and die elements to define the solid features of the vane assembly 176 following the casting process, in which molten metal replaces the voids inside a ceramic shell initially occupied by the wax. In some examples, the core 195 is removed after the casting of the vane assembly 176, such as by leaching. In some examples, the core 195 may be leached through the rail 172. In some examples, with reference back to FIG. 5A, the cooling holes 188 may be machined after the casting process.

Referring back to FIG. 5B, the core 195 includes an airfoil casting core portion 196, a platform shelf casting core portion 197, and a rail casting core portion 198. With reference to FIG. 5A, the airfoil casting core portion 196 forms the airfoil passage 192, the platform shelf casting core portion 197 forms the platform passage 193, and the rail casting core portion 198 forms the rail passage 194 in the vane assembly 176. As shown in the example, the airfoil casting core portion 196 may include a portion 196A for forming the leading edge cavity 192A, and a second portion 196B for forming the second cavity 192B. The platform shelf casting core portion 197 forms a shelf extending from the portion 196B, such that the cavity 192B is in direct fluid communication with the platform passage 193. The rail casting core portion 198 extends from the platform shelf casting core portion 197.

In some examples, the core 195, including the airfoil casting core portion 196, the platform shelf casting core portion 197, and the rail casting core portion 198, is a monolithic ceramic core. In other examples, the core 195 is not monolithic.

As illustrated in FIG. 6, the vane assembly 176 may include identical connected passages 191A and 191B relative to each airfoil 166A, 166B. The first connected passage 191A includes an airfoil portion 192 within the airfoil 166A, a platform passage 193 within the inner platform 170, and a rail passage 194 within the rail 172. The second connected passage 191B includes a second airfoil portion 192B within the second airfoil 166B, a second platform passage 193B within the inner platform 170, and a second rail passage 194B within the rail 172.

At least a portion of the platform passage 193A is aligned circumferentially between the airfoil 166A and the airfoil 166B. At least a portion of the platform passage 193B is aligned circumferentially between the airfoil 166B and the mate face 179. The mate face 179 may mate with the mate face 177 of an adjacent identical vane assembly 176. Cooling holes 188 may be provided at each area 184A, 184B and are in fluid communication with their respective platform passages 193A, 193B to provide film cooling to the areas 184A, 184B. In some examples, holes 188 are not provided at area 184B.

In some examples, the passages 191A, 191B, allow for cooling holes 188 to be placed in one or both of the areas 184A, 184B for improved cooling of those areas. In some examples, the passages 191A, 191B remove excess metal from the inner platform 170, so as to reduce the thermal mass for improved cooling.

FIG. 7 illustrates a flow chart of an example method 200 of manufacturing a vane assembly 176, such as that disclosed in FIGS. 5A-6 in some examples. The method 200 includes, at 202, forming a monolithic ceramic core 195 including an airfoil casting core portion 196, a platform shelf casting core portion 197, and a rail casting core portion 198. At 204, the method 200 includes casting a vane assembly 176 around the core. The vane assembly 176 includes an outer platform 168, an inner platform 170, an airfoil 166/166A/166B extending from the outer platform 168 to the inner platform 170, and a rail 172 extending radially inward from the inner platform 170. The airfoil casting core portion 196 forms a first passage 192 within the airfoil, the platform passage 197 forms a second passage 193 within the inner platform 170, and the rail casting core portion 198 forms a third passage 194 within the rail 172.

In some examples, the step 204 may include forming a wax pattern around the ceramic core 195, forming a dipped ceramic shell around the wax pattern, removing the wax pattern to form a void, and then casting the vane assembly 176 in the void.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine comprising:
    a compressor section rotatable about an axis;
    a combustor in fluid communication with the compressor section;
    a turbine section in fluid communication with the combustor, the turbine section including
    a vane assembly including a radially outer platform with respect to the axis, a radially inner platform, a first airfoil extending from the radially outer platform to the radially inner platform, a leading edge rail and a trailing edge rail extending radially inward from the inner platform, and a connected passage including an airfoil passage within the first airfoil, a platform passage within the inner platform, and a rail passage within the leading edge rail, wherein the airfoil passage, the platform passage, and the rail passage are fluidly connected.

2. The gas turbine engine as recited in claim 1, comprising a second airfoil extending from the radially outer platform to the radially inner platform, a second connected passage including a second airfoil passage within the second airfoil, a second platform passage within the inner platform, and a second rail passage within the leading edge rail, wherein the second airfoil passage, the second platform passage, and the second rail passage are fluidly connected.

3. The gas turbine engine as recited in claim 1, wherein a plurality of cooling holes extend from the platform passage to a gaspath surface of the inner platform.

4. The gas turbine engine as recited in claim 3, wherein the plurality of cooling holes extend toward a trailing edge of the platform as they extend toward the gaspath surface.

5. The gas turbine engine as recited in claim 1, wherein the airfoil passage forms a leading edge cavity and a second cavity spaced toward a trailing edge of the airfoil from the leading edge cavity, and both the leading edge cavity and the second cavity are fluidly connected with the platform passage.

6. The gas turbine engine as recited in claim 1, comprising a cooling air source configured to supply cooling air from the outer platform through the airfoil passage, and from the airfoil passage to the platform passage.

7. The gas turbine engine as recited in claim 6, wherein a plurality of cooling holes extend from the platform passage to a gaspath surface of the inner platform, and are configured to allow at least a portion of the cooling air in the platform passage to exit through the plurality of cooling holes.

8. The gas turbine engine as recited in claim 1, wherein the turbine comprises:
a first row of vanes;
a second row of vanes aft of the first row of vanes;
a row of blades axially between the first row of vanes and second row of vanes;
the second row of vanes including the vane assembly.

9. The gas turbine engine as recited in claim 8, wherein the second row of vanes includes a second vane assembly identical to the vane assembly.

10. A vane assembly for a gas turbine engine, comprising an outer platform; an inner platform; a first airfoil extending from the outer platform to the inner platform; a leading edge rail and a trailing edge rail extending from the inner platform in a direction away from the first airfoil; a connected passage including an airfoil passage within the first airfoil, a platform passage within the inner platform, and a rail passage within the leading edge rail, wherein the airfoil passage, the platform passage, and the rail passage are fluidly connected; and a plurality of cooling holes extending from the platform passage to a gaspath surface of the inner platform.

11. The vane assembly as recited in claim 10, comprising a second airfoil extending from the outer platform to the inner platform, wherein the platform passage is aligned circumferentially between a pressure side of the first airfoil and a suction side of the second airfoil.

12. The vane assembly as recited in claim 10, comprising a second airfoil extending from the outer platform to the inner platform, a second connected passage including a second airfoil passage within the second airfoil, a second platform passage within the inner platform, and a second rail passage within the leading edge rail, wherein the second airfoil passage, the second platform passage, and the second rail passage are fluidly connected.

13. The vane assembly as recited in claim 12, wherein the platform passage is aligned circumferentially between a pressure side of the first airfoil and a suction side of the second airfoil, and the second platform passage is aligned circumferentially between a pressure side of the second airfoil and a mate face of the platform.

14. The vane assembly as recited in claim 11, wherein the plurality of cooling holes extend toward a trailing edge of the platform as they extend toward the gas path surface.

15. The gas turbine engine as recited in claim 1, wherein the leading edge of the platform passage is aft of the leading edge of the airfoil.

16. A vane assembly for a gas turbine engine, comprising an outer platform;

an inner platform;

a first airfoil extending from the outer platform to the inner platform;

a leading edge rail and a trailing edge rail extending from the inner platform in a direction away from the first airfoil; a connected passage including an airfoil passage within the first airfoil, a platform passage within the inner platform, and a rail passage within the leading edge rail, wherein the airfoil passage, the platform passage, and the rail passage are fluidly connected, wherein the leading edge of the platform passage is aft of the leading edge of the airfoil; and a plurality of cooling holes extending from the platform passage to a gaspath surface of the inner platform extending toward a trailing edge of the platform as they extend toward the gas path surface; a second airfoil extending from the outer platform to the inner platform; a second connected passage including a second airfoil passage within the second airfoil, a second platform passage within the inner platform, and a second rail passage within the leading edge rail, wherein the second airfoil passage, the second platform passage, and the second rail passage are fluidly connected, the leading edge of the second platform passage is aft of the leading edge of the second airfoil, the platform passage is aligned circumferentially between a pressure side of the first airfoil and a suction side of the second airfoil, and the second platform passage is aligned circumferentially between a pressure side of the second airfoil and a mate face of the platform.

17. The vane assembly as recited in claim 16, comprising a second plurality of cooling holes extending from the second platform passage to a gaspath surface of the inner platform extending toward a trailing edge of the platform as they extend toward the gas path surface.

18. The vane assembly as recited in claim 16, wherein the airfoil passage forms a leading edge cavity and a second cavity spaced toward a trailing edge of the airfoil from the leading edge cavity, and both the leading edge cavity and the second cavity are fluidly connected with the platform passage; and the second airfoil passage forms a third cavity and a fourth cavity spaced toward a trailing edge of the airfoil from the third cavity, and both the third cavity and the fourth cavity are fluidly connected with the second platform passage.

* * * * *